United States Patent [19]
Chen et al.

[11] Patent Number: 5,203,760
[45] Date of Patent: Apr. 20, 1993

[54] APPARATUS FOR ADJUSTMENT OF THE SPACING OF FILM DRIVE ASSEMBLIES IN A TUBULAR FILM FORMING DEVICE

[75] Inventors: Kuo-Raid G. Chen, Cary; Raymond H. Misner, Raleigh; Elbert P. Windham, Fuquay-Varina; Bernard D. Richardson, Apex, all of N.C.

[73] Assignee: Delaware Capital Formation, Inc., Apex, N.C.

[21] Appl. No.: 884,736

[22] Filed: May 15, 1992

[51] Int. Cl.⁵ .................. B65B 9/06; B31B 23/10
[52] U.S. Cl. .................... 493/302; 493/479
[58] Field of Search ............ 493/302, 478, 479; 53/551, 552

[56] References Cited

U.S. PATENT DOCUMENTS

| | | | |
|---|---|---|---|
| 3,486,424 | 12/1969 | Tanner | 93/82 |
| 3,729,359 | 4/1973 | Monsees | 156/466 |
| 3,779,836 | 12/1973 | Henry et al. | 156/466 |
| 4,136,505 | 1/1979 | Putnam, Jr. et al. | 53/551 |
| 4,218,863 | 8/1980 | Howard et al. | 53/547 |
| 4,421,499 | 12/1983 | Kuipers | 493/23 |
| 4,563,792 | 1/1986 | Niedecker | 17/33 |
| 4,581,005 | 4/1986 | Moen | 493/167 |
| 4,640,083 | 2/1987 | Takahashi et al. | 53/551 |
| 4,642,849 | 2/1987 | Piereder | 17/49 |
| 4,683,700 | 8/1987 | Evans et al. | 53/138 |
| 4,697,403 | 10/1987 | Simpson et al. | 53/551 |
| 4,711,068 | 12/1987 | Dominguez | 53/551 |
| 4,718,217 | 1/1988 | Ross | 53/504 |
| 4,730,367 | 3/1988 | Vinokur | 17/49 |
| 4,773,128 | 9/1988 | Stanley et al. | 17/49 |
| 4,847,953 | 7/1989 | Evans et al. | 17/35 |

FOREIGN PATENT DOCUMENTS

| | | |
|---|---|---|
| 3244372 | 11/1982 | Fed. Rep. of Germany . |
| 0177992 | 8/1985 | Fed. Rep. of Germany . |
| 203418 | 9/1923 | United Kingdom ........... 493/478 |

Primary Examiner—William E. Terrell
Attorney, Agent, or Firm—Allegretti & Witcoff, Ltd.

[57] ABSTRACT

Apparatus for adjusting the spacing of drive assemblies for transport of tubular film over a forming tube includes adjustment arms attached to each of the separate spaced drive assemblies which are attached to a rotatable adjustment plate. Rotation of the adjustment plate about its axis simultaneously moves the drive assemblies in equal and opposite directions with respect to the centerline of the tubular film product.

5 Claims, 3 Drawing Sheets

APPARATUS FOR ADJUSTMENT OF THE SPACING OF FILM DRIVE ASSEMBLIES IN A TUBULAR FILM FORMING DEVICE

BACKGROUND OF THE INVENTION

This invention relates to apparatus for the manufacture of an elongated tubular film product from a length of flexible flat film by means of a forming collar which folds and shapes the flat flexible film about a cylinder or mandrel.

Applicant's assignee is the owner of U.S. Pat. No. 5,085,036 which is incorporated herewith by reference U.S. Pat. No. 5,085,036 discloses an apparatus for the high speed manufacture of elongated tubular film products from a length of flexible flat film. In that patent, film from a roll is unspooled, passed over a forming collar and thence onto a forming tube. The film on the tube has longitudinal edges that are overlapped and sealed or attached to one another. The film is advanced on the tube by a pair of opposed drive units which are positioned on opposite sides of the forming tube. The advance or drive units transport the film over the tube continuously. The film advance units comprise boggie mounted drive belts positioned on opposite sides of the forming tube. The closed loop belts are designed to frictionally engage the formed film and transfer the film along the tube. In operation these drive units are precisely adjusted to maintain an appropriate spacing between the forming tube and the boggie mounted drive belts. It is important to make sure that the drive belts on each side of the elongate forming tube are uniformly and equally spaced from the forming tube so that the film can be uniformly driven or moved on the tube.

Adjustment of the spacing of the drive units such as the boggie mounted drive belt has required a mounting mechanism which independently positions each boggie mounted drive belts as a desired distance from the center line of the tube. There has remained a need, however, to provide an improved mechanism to simultaneously position the drive or transport assemblies or units on the opposite sides of the cylindrical forming tube. The present invention relates to such a mechanism.

SUMMARY OF THE INVENTION

In a principal aspect the present invention comprises an improved mechanism for mounting and adjusting parallel, spaced transport assemblies or drive units associated with a device for forming a flat sheet of film into a tubular hollow cylindrical shape. The apparatus of the invention is thus comprised of a support frame which supports a film form collar and a forming member. The film form collar is positioned to guide film onto the forming member. The forming member is a generally cylindrical tube. The film which is formed over the tube has overlapping, longitudinal edges and a heat seal mechanism is provided to seal the overlapping edges. Adjacent the heat seal mechanism and along the sides of the generally cylindrical tube are spaced, generally parallel transport assemblies or drive units which are desirably maintained an equal distance from the center line of the cylindrical tube.

The specific invention improvement is an assembly support and adjustment mechanism for the drive unit which insures that the transport assemblies or drive units will uniformly move toward and away from the cylindrical tube and further which provides that the transport assemblies may be maintained at a preadjusted fixed and desired position relative to the cylindrical forming tube. Thus, the improvement includes at least one assembly or drive units support bar which is mounted generally transversely to the center line of the tube and which extends over the range of lateral movement of the film transport assemblies. A means for slidably mounting each of the transport assemblies on the support bar to permit movement thereof toward and away from the center line is provided. A spacing adjustment plate is typically mounted adjacent the assemblies at one side thereof for pivotal movement about an axis. A first arm pivotally connects one transport assembly to the adjustment plate. A second arm pivotally connects the other assembly to the adjustment plate. The first and second arms are attached to the plate on opposite sides of the plate axis. In this manner, the pivotal movement of the plate about its axis will simultaneously move the first and second arms in opposite directions and thereby simultaneously impart opposite sliding movement of the assemblies on the support bar toward or away from the center line.

Thus, it is the object of the invention to provide an improved mechanism for adjustment of film transport assemblies associated with a tubular film forming apparatus.

Yet, a further object of the invention is to provide a mechanically efficient yet simple mechanism for adjusting the spacing of tube drive units in a uniform manner.

Another object of the invention is to provide a mechanism for adjusting the spacing of parallel drive units.

These and other objects, advantages and features of the invention will be set forth in the detailed description.

BRIEF DESCRIPTION OF THE DRAWING

In the detailed description which follows reference will be made to drawing comprised of the following figures.

DESCRIPTION OF THE PREFERRED EMBODIMENT

Figure 1:
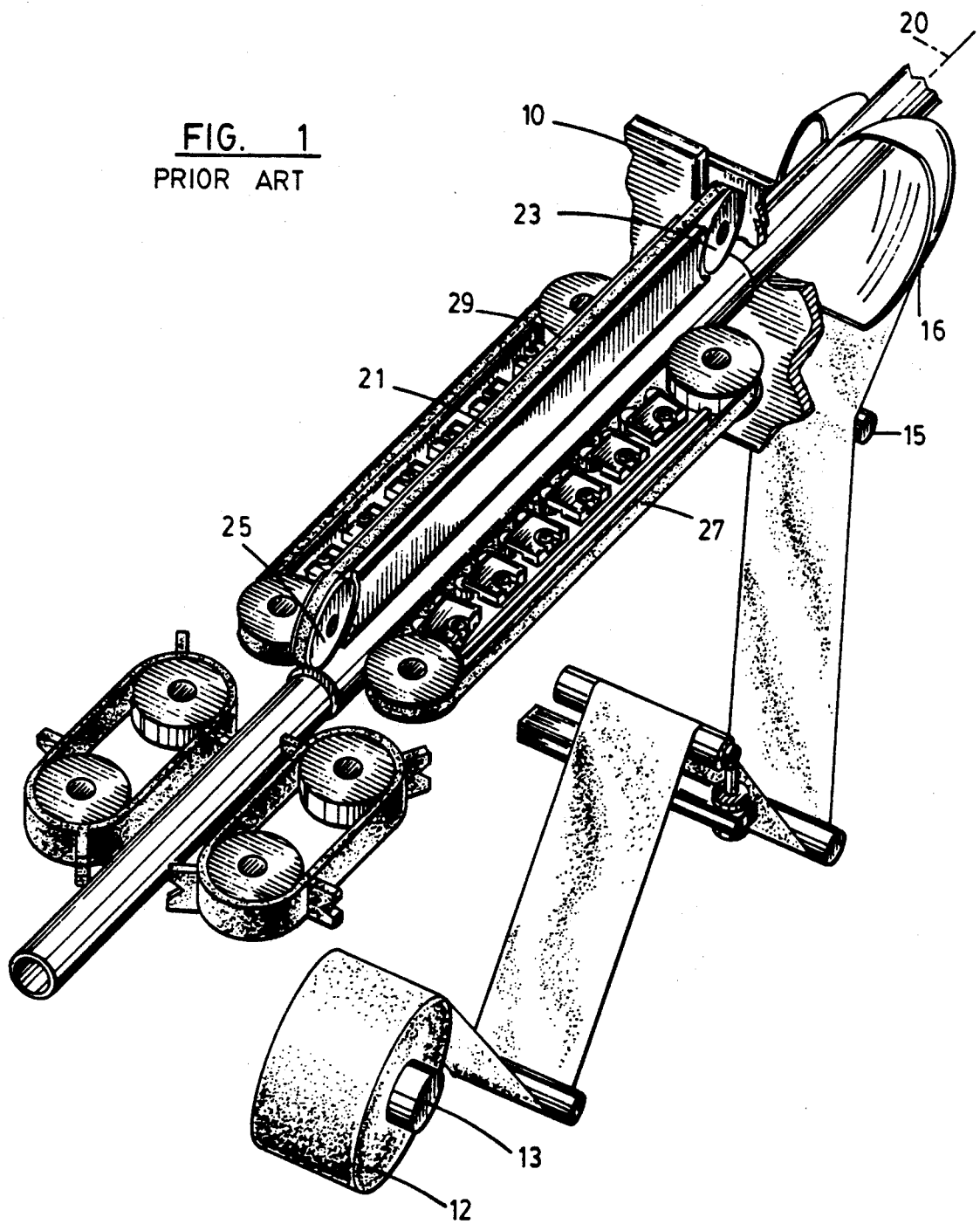
FIG. 1 is a perspective view of a prior art construction.
Figure 2:
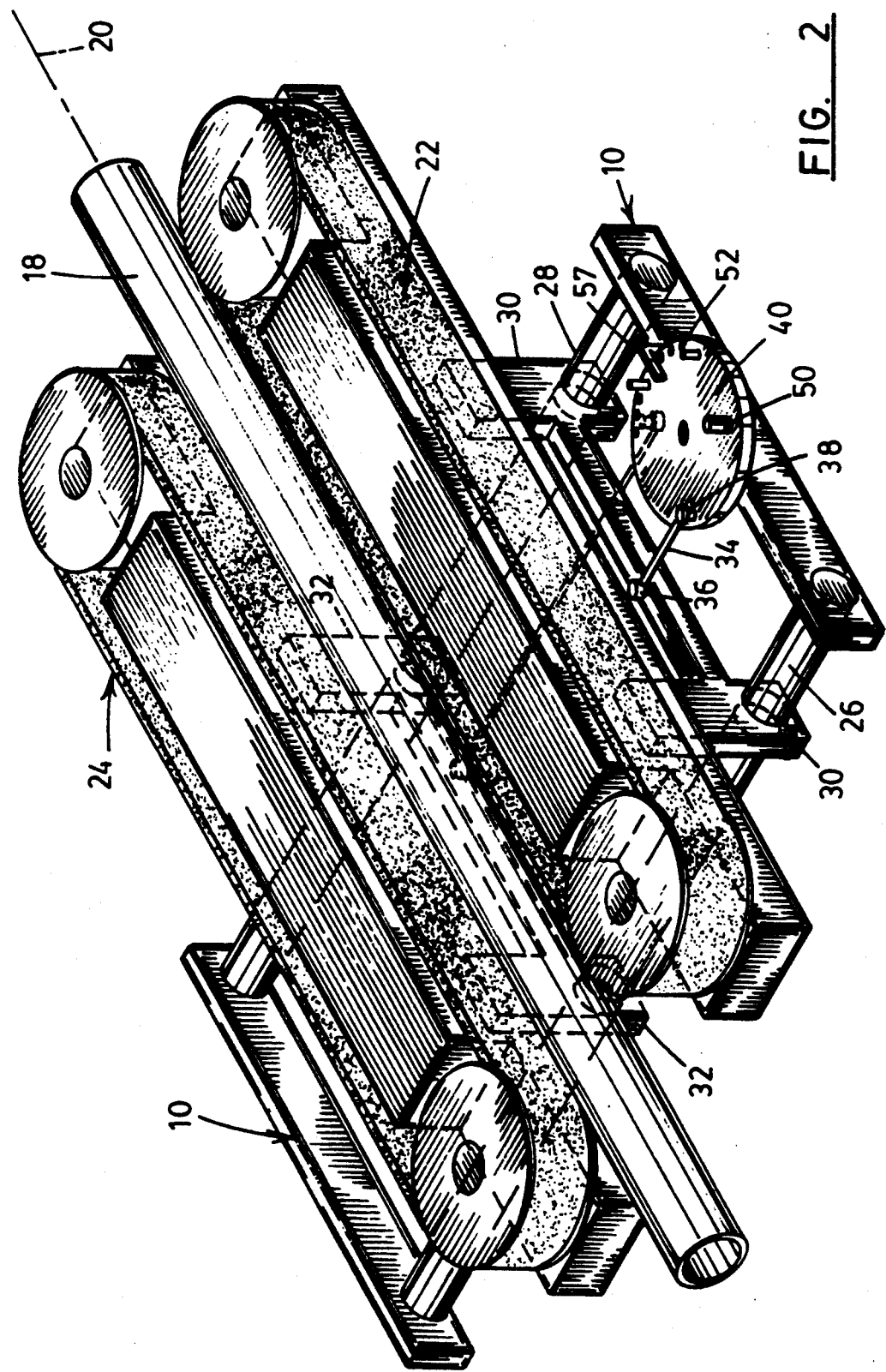
FIG. 2 is a perspective view of the improvement of the present invention.
Figure 3:
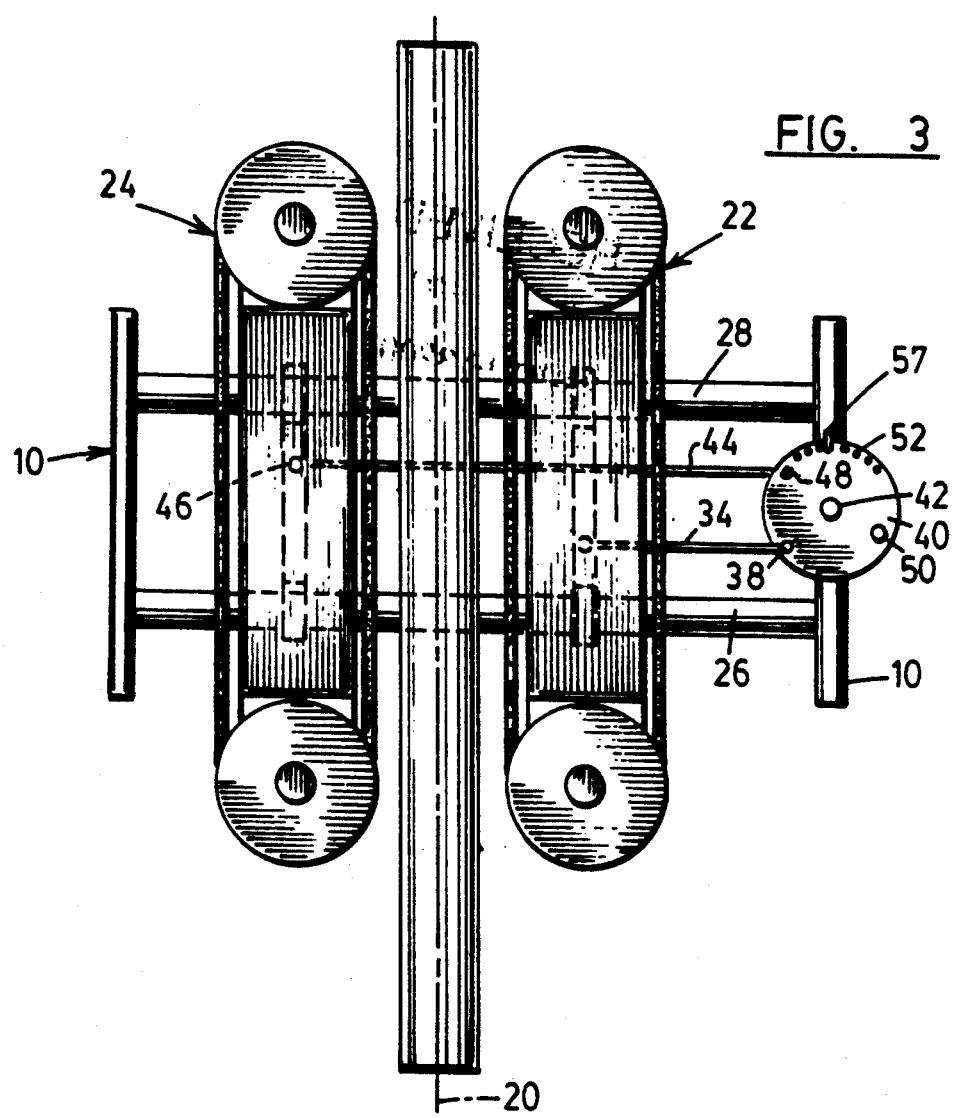
FIG. 3 is a top plan view of the improvement of the invention.
Figure 4:
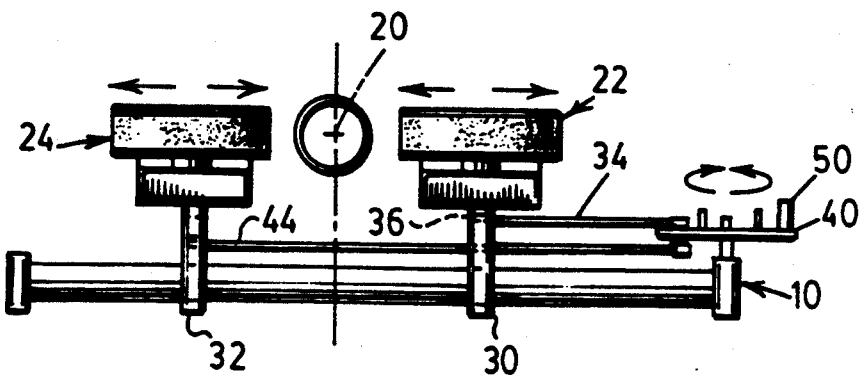
FIG. 4 is an end view of the construction of FIG. 3.

FIG. 1 is taken from U.S. Pat. No. 5,085,036. There a mounting frame 10 is provided for the component parts for forming a flat sheet of film 14 into a tubular shape. The sheet of film 14 is unrolled from a roll 12 mounted on a spindle 13. Various rollers, e.g. roller 15, tension the sheet of film 14 and align the sheet of film 14 for feeding the sheet of film 14 over a forming collar 16. Collar 16 forms the film 14 into a tubular shape with overlapping edges and directs the film 14 onto a generally cylindrical tube 18. There the overlapping edges are sealed by some means such as by application of a heat seal, adhesive or the like. The depicted device uses a heated band 21 mounted on pulley wheels 23, 25 to effect a seal. The film 14 is advanced on tube 18 by endless belts 27, 29 positioned on opposite sides of tube 18.

Referring to the remaining Figures, there is depicted the improvement of the apparatus of the invention is supported on the mounting frame 10 upon which the components for forming the flat sheet of film 14 into a tubular shape are arranged. The film 14 is released from a roll 12 of flat film 14. The sheet 14 of film passes over various rollers and guides and ultimately over the collar 16 which forms the flat film 14 into a tubular shape. The sheet of film 14 then folds over a generally cylindrical tube 18 where the overlapping longitudinal edges of the sheet of film 14 may be sealed by some means such as by application of adhesive, heat or the like.

The tube 18 has a centerline 20. Positioned on opposite sides of the tube 18 generally equal distances from the center line 20 are first and second spaced transport assemblies 22 and 24. Each spaced transport assemblies 22 and 24 may be, for example, be a boggie mounted drive belt such as depicted in U.S. Pat. No. 5,085,036. Other types of transport assemblies or drive units 22, 24 may utilized and still be within the scope of the present invention.

The first spaced transport assembly 22 is slidably mounted on transverse support bars 26 and 28 which extend transversely to the center line 20 and connect with the frame 10. The second assembly 24 is likewise slidably mounted on the bars 26, 28. The assemblies 22 and 24 are thus, slidably mounted on the bars 26 and 28 by means of slide mounts 30 and 32. The first assembly 22 is typically attached to a transfer arm 34 by a pivot connection 36. The opposite end of the arm 34 is pivotally attached by a transfer pivot connection 38 to a plate 40. The plate 40 is generally circular in configuration and is mounted on the frame 10 to pivot about a vertical axis 42. A second arm 44 is pivotally connected to the second transfer assembly 24 through a pivot connection 46. The opposite end of arm 44 is pivotally attached to plate 40 at pivot connection 48. Note that pivot connection 48 is opposite the connection 38 and on the opposite side of a line through the axis 42 and parallel to the bars 26 and 28. A handle 50 is provided for manual rotation of the plate 40. In dicia or detents 52 are provided to indicate the amount rotation of the plate 40 about axis 42. The plate 40 may be rotated by motor means (not shown) as well as manually.

In operation, each transport assembly 22 and 24 is moved toward and away from the centerline 20 uniformly and simultaneously by rotation of the plate 40. Rotation of the plate 40 in a first direction will cause the arm 44 to move toward the center line and will simultaneously cause the arm 34 to also be moved toward the center line. This simultaneously causes the assemblies or units 22 and 24 to slide on the transverse bars 26 and 28 simultaneously and uniformly. In the preferred embodiment, the arms 34 and 44 are attached to the plate 40 and arranged so that the pivot connections 38 and 48 are equal radial distances from the axis 42. Placement of the pivot connections 38, 48 at unequal distances from the axis 42 would cause non uniform translation of the assemblies 22 and 24 upon rotation of the plate 40. In certain circumstances this may be desirable.

When the assemblies 22 and 24 are properly positioned relative to a cylindrical tube 18 and with respect to the centerline 20 of the tube 18, the detents 52 should be noted. A locking arm 57 may be operated co-jointly with the plate 40 to insure that the plate 40 and thus the assemblies 22 and 24 are locked into a desired detent position. In this manner, the position of the assemblies 22 and 24 is reproducible with respect to the center line 20 of the cylindrical tube 18. Thus, the construction which is depicted can be utilized to uniformly and simultaneously move boggie mounted drive belts, for example, such as shown in U.S. Pat. No. 5,085,036. Obviously, other types of drive assemblies may be utilized other than those shown in U.S. Pat. No. 5,085,036.

Thus, while there has been set forth a preferred embodiment of the invention it is to be understood that the invention is to be limited only by the following claims and their equivalents.

What is claimed is:

1. In apparatus for forming a sheet of flexible material into a cylindrical shape, said apparatus including a generally cylindrical tube as a form for the sheet and further including spaced, generally parallel transport assemblies positioned on opposite sides of the tube, the improvement of a mounting and adjustment mechanism for controlling the movement and spacing of the spaced transport assemblies from a center line between the parallel assemblies, said center line generally coincident with the center line of the tube, said improvement comprising, in combination:

at least one assembly support bar mounted generally transversely to the center line and extending over the range of desired travel of the assemblies;

means for slidably mounting each assembly on the support bar for slidable movement toward and away from the center line;

a spacing adjustment plate pivotally mounted adjacent the assemblies for pivot movement about an axis;

a first arm pivotally connected to one assembly and extending generally parallel to the support bar to pivotally attached to the spacing adjustment plate at a first position which is a first fixed radial distance from the axis thereof;

a second arm pivotally connected to the other assembly and extending generally parallel to the support bar to pivotally attach to the spacing adjustment plate at a second position which is a second fixed radial distance from the axis thereof, said first and second positions of attachment to the plate being on opposite sides of the plate axis whereby pivotal movement of the plate about its axis will simultaneously move the first and second arms in opposite directions and simultaneously in part opposite sliding movement of the assemblies on the support bar toward or away from the center line.

2. The improvement of claim 1 wherein first and second parallel support bars are mounted to slidably support the assemblies.

3. The improvement of claim 1 wherein the spacing adjustment plate is pivotally mounted to at one side of an assembly.

4. The improvement of claim 1 wherein the first fixed radial distance is equal to the second fixed radial distance whereby the assemblies move in an opposite sense and equal distance upon pivotal movement of the plate about the axis.

5. The improvement of claim 4 including means on the adjustment plate for locking the plate in a fixed pivotal position.

* * * * *

UNITED STATES PATENT AND TRADEMARK OFFICE
CERTIFICATE OF CORRECTION

PATENT NO. : 5,203,760

DATED : April 20, 1993

INVENTOR(S) : Kuo-Raid G. Chen, et al.

It is certified that error appears in the above-identified patent and that said Letters Patent is hereby corrected as shown below:

In claim 1, col. 4, line 36, change "attached" to --attach--.

In claim 1, col. 4, line 48, change "in part" to --impart--.

In claim 3, col. 4, line 55, after "mounted", delete "to".

Signed and Sealed this

Twenty-sixth Day of April, 1994

Attest:

BRUCE LEHMAN

Attesting Officer     Commissioner of Patents and Trademarks